(12) United States Patent
Ochi

(10) Patent No.: US 10,725,263 B2
(45) Date of Patent: Jul. 28, 2020

(54) LENS APPARATUS AND IMAGING APPARATUS INCLUDING THE SAME

(71) Applicant: CANON KABUSHIKI KAISHA, Tokyo (JP)

(72) Inventor: Daisuke Ochi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 15/894,030

(22) Filed: Feb. 12, 2018

(65) Prior Publication Data

US 2018/0231734 A1 Aug. 16, 2018

(30) Foreign Application Priority Data

Feb. 14, 2017 (JP) ................................. 2017-025378

(51) Int. Cl.
  *G02B 7/02* (2006.01)
  *G02B 27/64* (2006.01)
(52) U.S. Cl.
  CPC ............ *G02B 7/021* (2013.01); *G02B 27/646* (2013.01)
(58) Field of Classification Search
  CPC ..................................................... G02B 7/021
  USPC ........................................................ 396/542
  See application file for complete search history.

(56) References Cited

U.S. PATENT DOCUMENTS

| 8,570,666 B2 * | 10/2013 | Koyama | ................ G02B 7/102 359/704 |
| 2006/0115261 A1 | 6/2006 | Nomura | |
| 2013/0194680 A1 | 8/2013 | Kobayashi | |

FOREIGN PATENT DOCUMENTS

| CN | 102243360 A | | 11/2011 |
| GB | 2309531 B | | 7/2000 |
| JP | 08102575 A | * | 4/1996 |
| JP | 2008065179 A | * | 3/2008 |
| JP | 2008-122541 A | | 5/2008 |
| JP | 2013037304 A | * | 2/2013 |
| JP | 2013-061386 A | | 4/2013 |
| JP | 2013-231892 A | | 11/2013 |
| JP | 2014-191164 A | | 10/2014 |
| JP | 2015-203818 A | | 11/2015 |
| JP | 2016-130761 A | | 7/2016 |

* cited by examiner

*Primary Examiner* — Clayton E. LaBalle
*Assistant Examiner* — Leon W Rhodes, Jr.
(74) *Attorney, Agent, or Firm* — Canon U.S.A., Inc. I.P. Division

(57) ABSTRACT

A lens apparatus includes a first barrel including a first connection portion, a second barrel holding a lens, movable in an optical axis direction of the lens relative to the first barrel, and including a second connection portion, a flexible printed circuit board electrically connecting the first connection portion and the second connection portion, and a restricting portion provided in either one of the first barrel and the second barrel in the radial direction and restricting a portion of the flexible printed circuit board between the first and second connection portions from moving in the radial direction.

16 Claims, 10 Drawing Sheets

LENS APPARATUS AND IMAGING APPARATUS INCLUDING THE SAME

BACKGROUND OF THE INVENTION

Field of the Invention

The present disclosure is generally directed to lens technology and, more particularly, to a lens apparatus that can reduce movement of a flexible printed circuit board in the operation of an optical apparatus such as a lens apparatus and thus, the flexible printed circuit board has high durability.

Description of the Related Art

An optical apparatus such as a camera, video camera, and interchangeable lens often includes two members that move relative to each other for zooming, focusing, or image stabilization, for example. These two members are sometimes coupled to each other with a flexible printed circuit board.

Japanese Patent Application Laid-Open No. 2014-191164 discusses a lens barrel into which a flexible printed circuit board is easily incorporated. This flexible printed circuit board is connected to a member that moves back and forth along an optical axis direction.

According to Japanese Patent Application Laid-Open No. 2014-191164, the flexible printed circuit board may be easily incorporated into the lens barrel, but may move in the thickness direction thereof along with a zooming operation. A problem may arise regarding durability; for example, the flexible printed circuit board may be easily scratched due to excessive contact between the flexible printed circuit board and the lens barrel caused by long-term use by a user.

SUMMARY OF THE INVENTION

According to an aspect of the present disclosure, a lens apparatus includes a first barrel including a first connection portion, a second barrel holding a lens, movable in an optical axis direction of the lens relative to the first barrel, held on an inner side of the first barrel in a radial direction of the optical axis, and including a second connection portion, a flexible printed circuit board electrically connecting the first connection portion and the second connection portion, and a restricting portion provided in either one of the first barrel and the second barrel in the radial direction and restricting a portion of the flexible printed circuit board between the first and second connection portions from moving in the radial direction, wherein the first barrel includes a protruding portion protruding inward in the radial direction, and the protruding portion contacting the portion of the flexible printed circuit board between the first and second connection portions and restricts the portion of the flexible printed circuit board between the first and second connection portions from moving outward in the radial direction.

further features of the present disclosure will become apparent from the following description of exemplary embodiments with reference to the attached drawings.

DESCRIPTION OF THE EMBODIMENTS

Hereinafter, an exemplary embodiment of the present disclosure will be described in detail with reference to the accompanying drawings.

Figure 1:
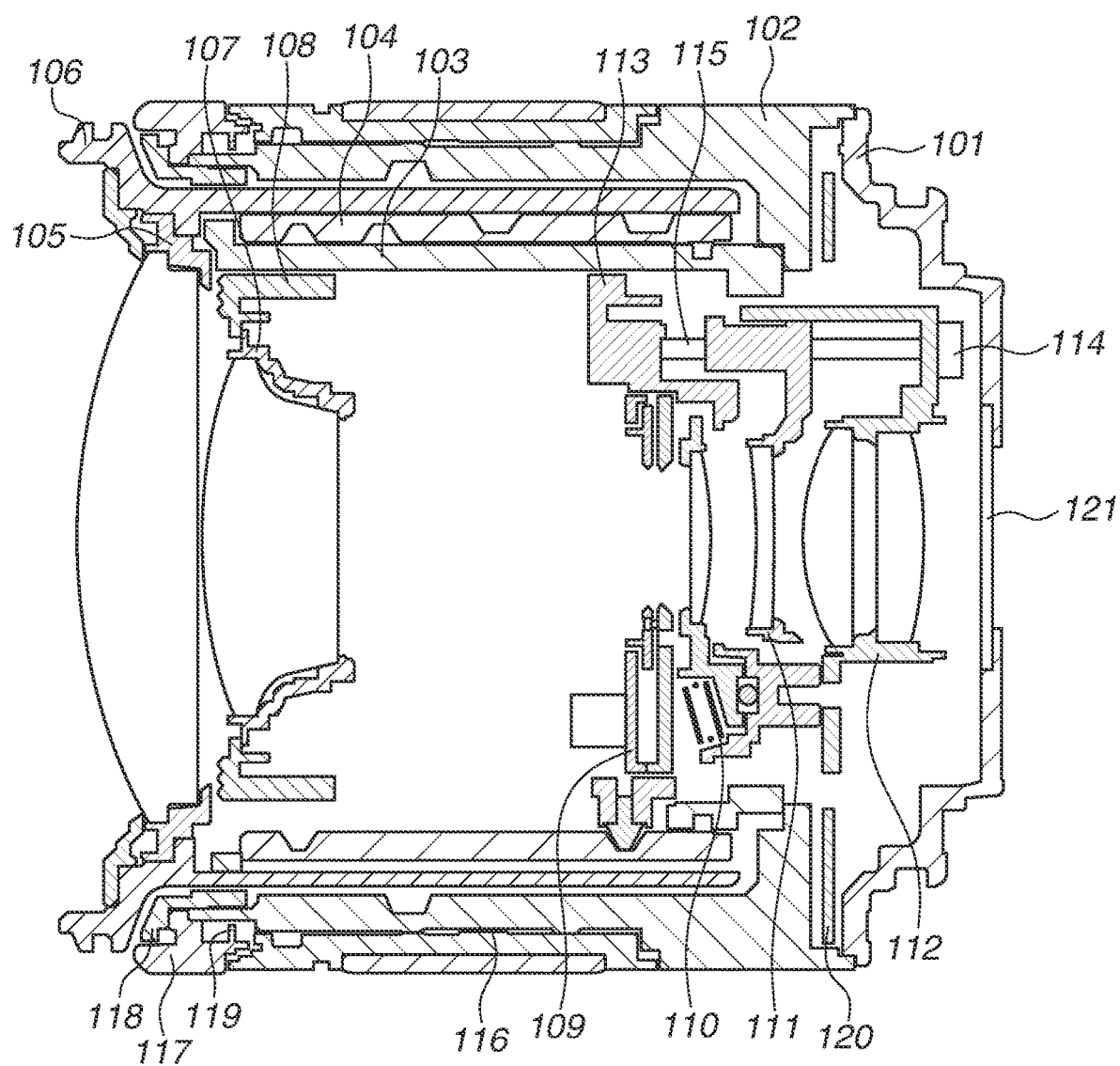
FIG. 1 is a schematic cross-sectional view (longitudinal cross-sectional view) of a lens barrel according to an exemplary embodiment.
Figure 2:
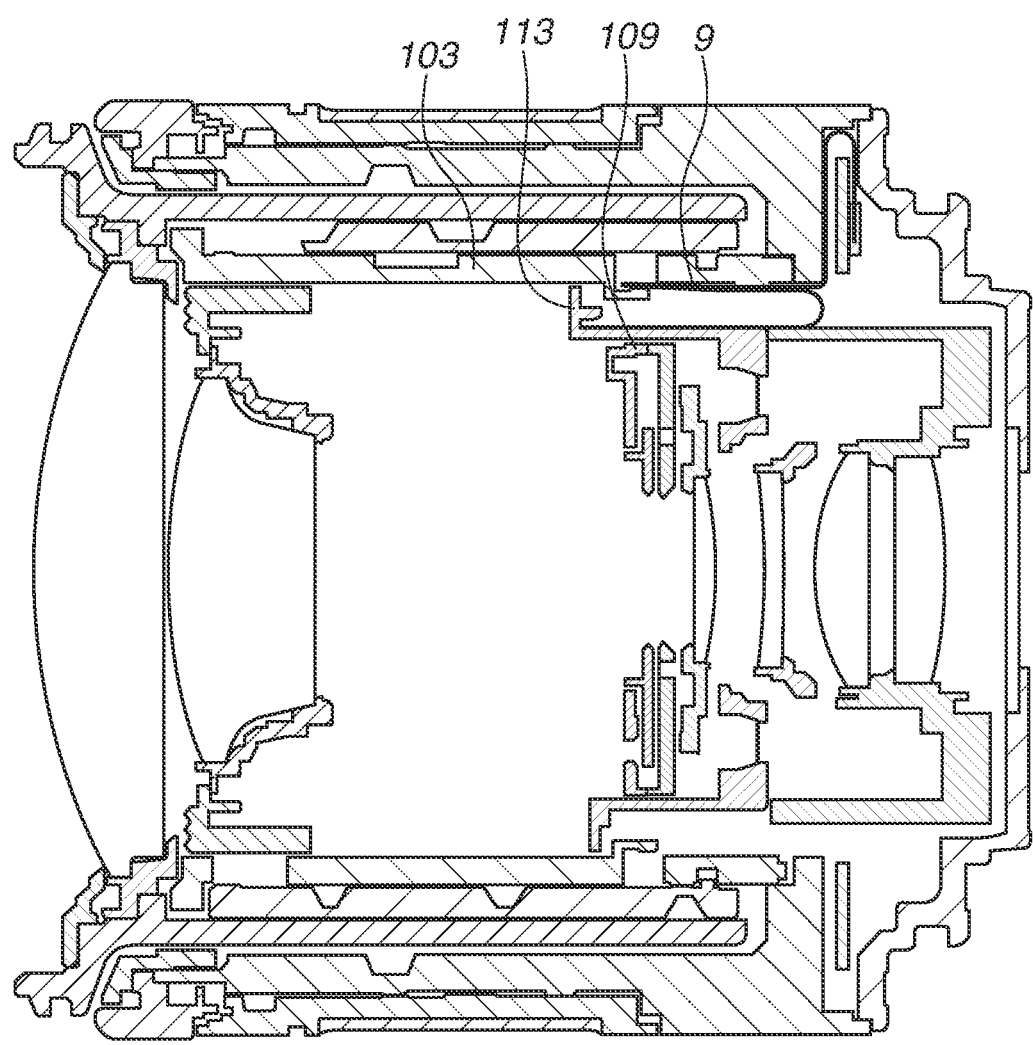
FIG. 2 is a schematic cross-sectional view (transverse cross-sectional view) of the lens barrel according to the exemplary embodiment at a wide-angle end.
Figure 3:
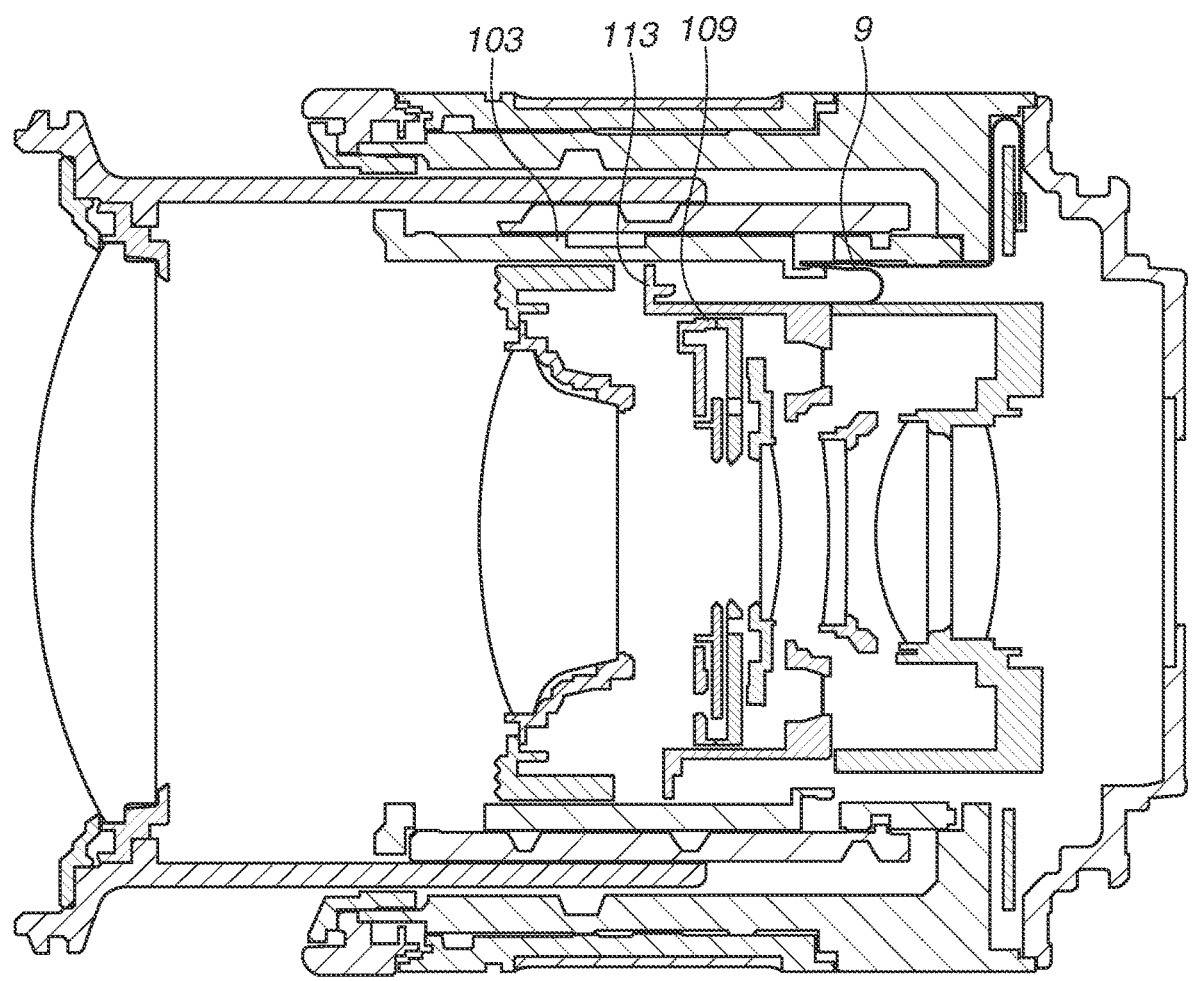
FIG. 3 is a schematic cross-sectional view (transverse cross-sectional view) of the lens barrel according to the exemplary embodiment at a telephoto end.
Figure 4:
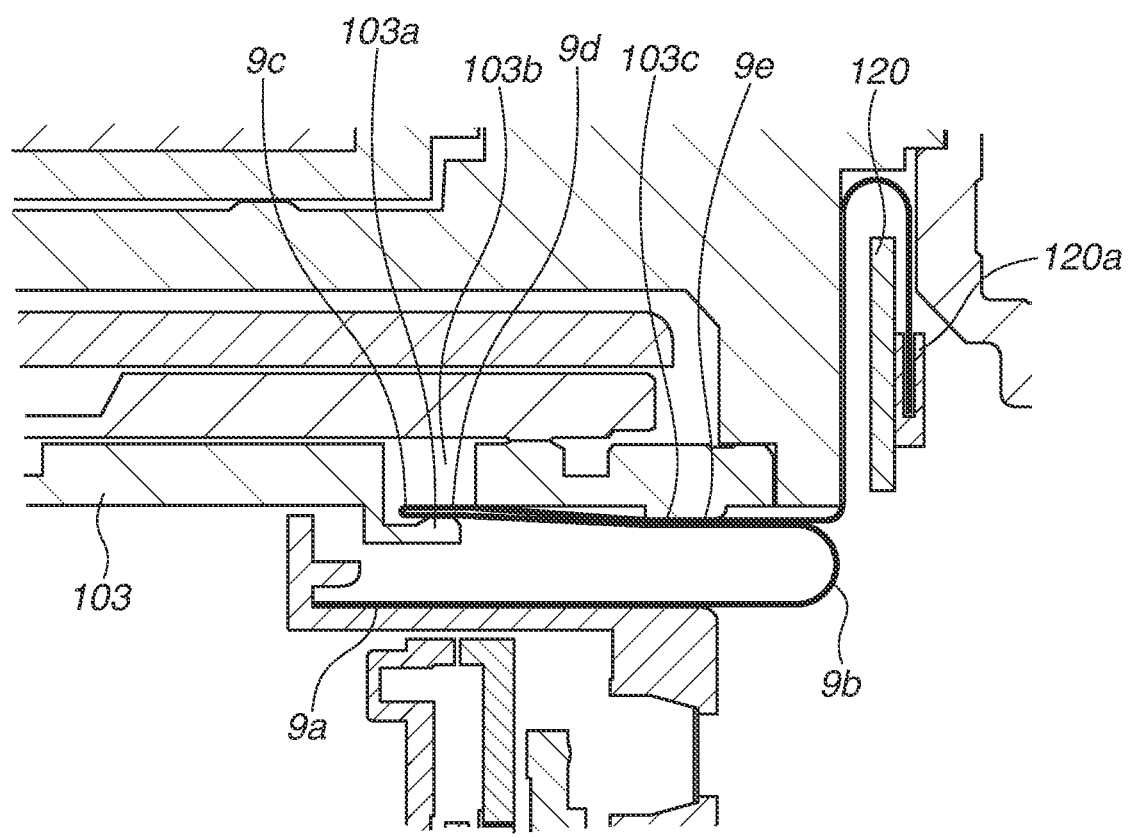
FIG. 4 is an enlarged cross-sectional view of the main part according to the exemplary embodiment in a wide-angle state.
Figure 5:
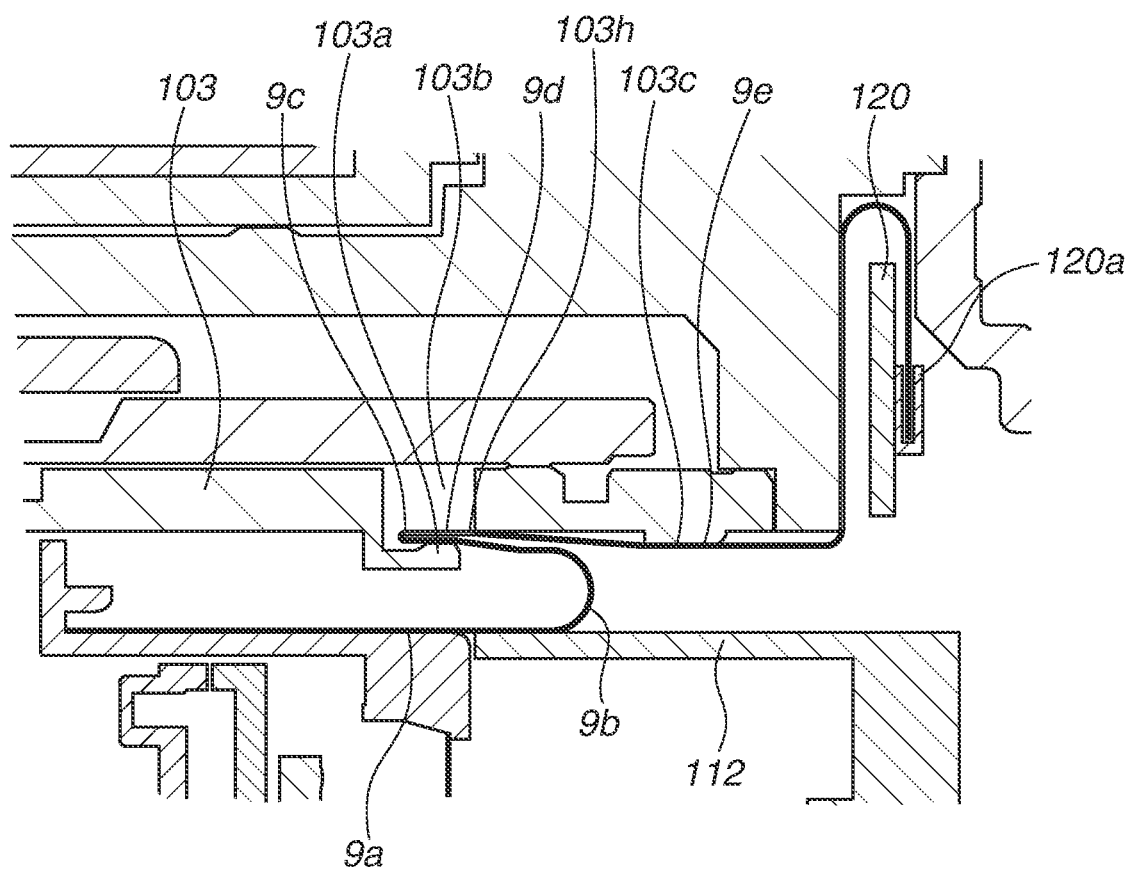
FIG. 5 is an enlarged cross-sectional view of the main part according to the exemplary embodiment in a telephoto state.
Figure 6:
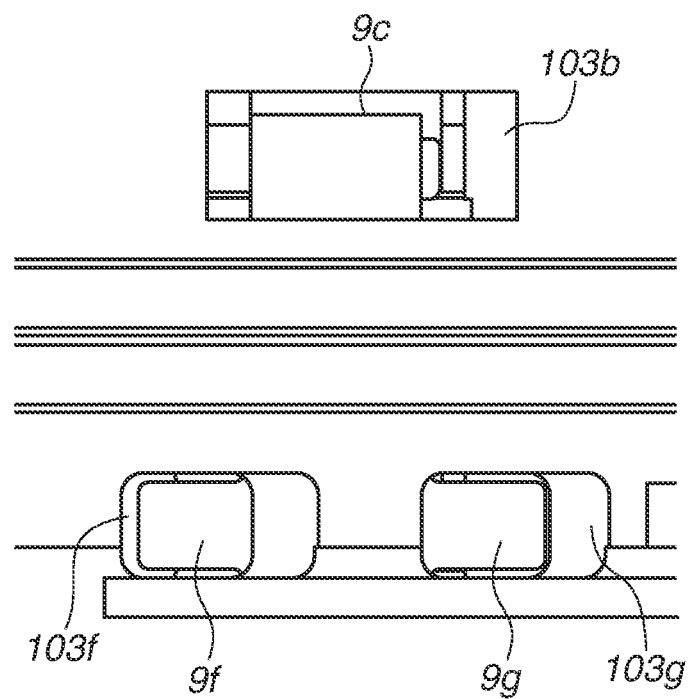
FIG. 6 is a view of a guide barrel (fixed barrel) of the main part according to the exemplary embodiment, as viewed from the outside.
Figure 7:
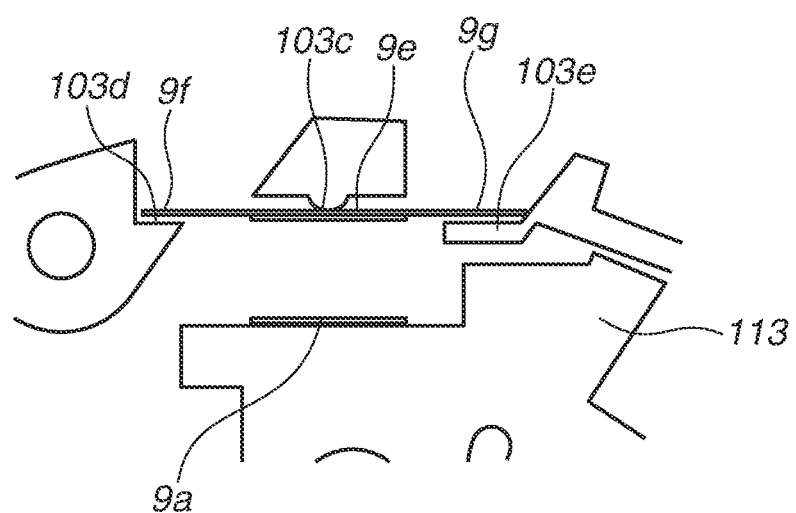
FIG. 7 is a cross-sectional view, along a plane perpendicular to an optical axis, of the main part of the exemplary embodiment.
Figure 8:
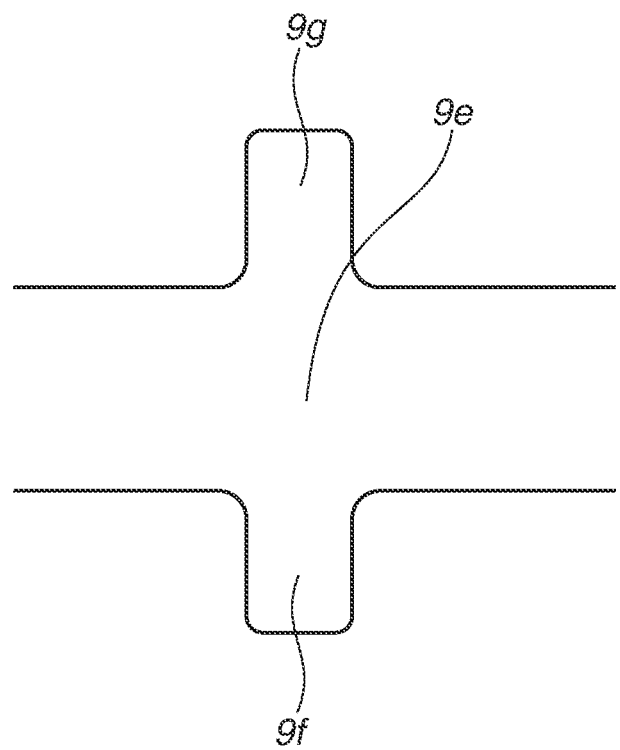
FIG. 8 is an enlarged view of example positions of extending portions of a flexible printed circuit board.
Figure 9:
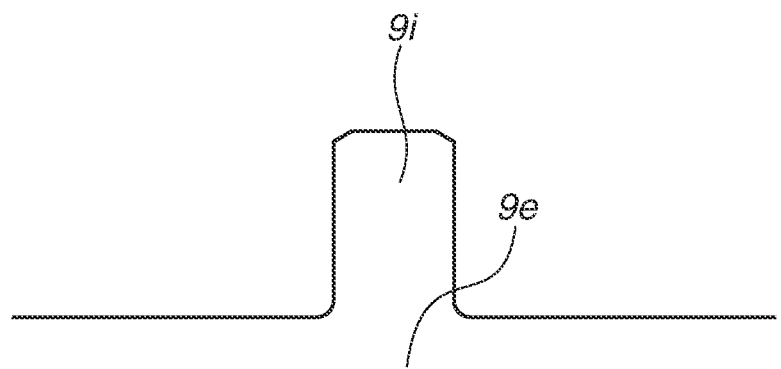
FIG. 9 is an enlarged view of another example of the extending portions of the flexible printed circuit board.
Figure 9:
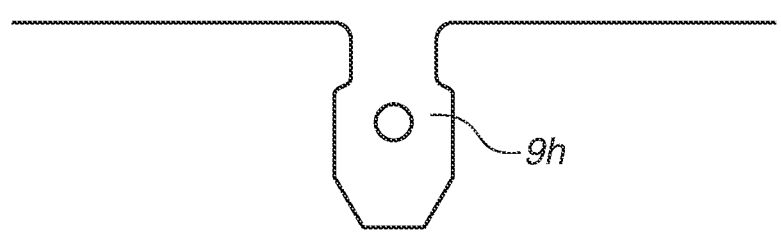

FIG. 1 is a longitudinal cross-sectional view of a lens barrel (lens apparatus) according to the present exemplary embodiment. A schematic configuration of the lens barrel according to the present exemplary embodiment will be described with reference to FIG. 1.

Figure 10:
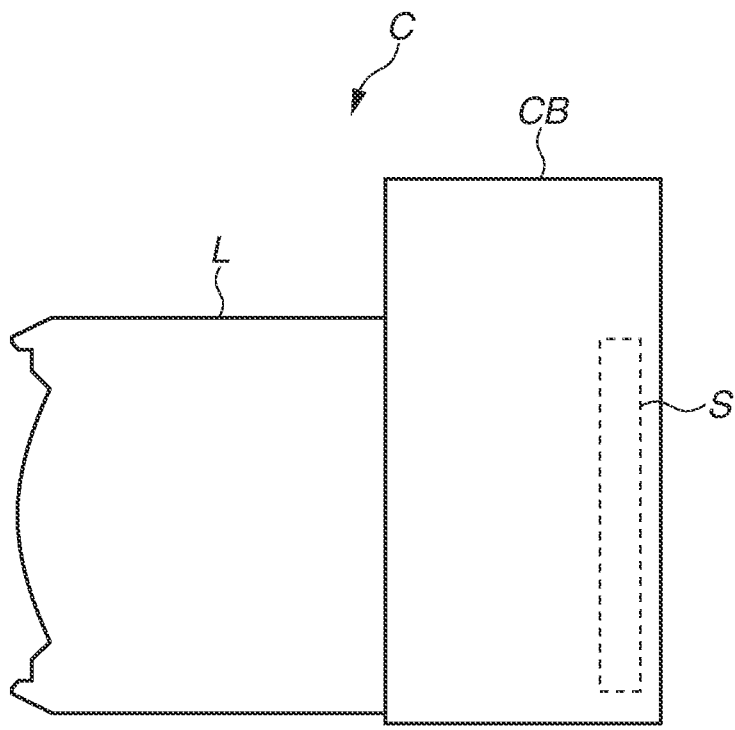
FIG. 10 is a schematic view of the imaging apparatus according to the exemplary embodiment.

An outer ring 102 is radially fitted to a mount 101 that is detachable from a camera body (e.g., camera body CB shown in FIG. 10). In addition, the outer ring 102 is in contact with the mount 101 in an optical axis direction of the lens barrel, and thus movement of the outer ring 102 in the optical axis direction is restricted. The outer ring 102 and the mount 101 are fastened to each other with screws. The mount 101 holds cover glass 121. A guide barrel (first barrel) 103 is radially fitted to the outer ring 102. The guide barrel 103 is in contact with the outer ring 102 in the optical axis direction, and thus movement of the guide barrel 103 in the optical axis direction is restricted. The guide barrel 103 and the outer ring 102 are fastened to each other with screws.

a cam ring 104 is radially fitted and coupled through bayonet coupling to the guide barrel 103. As a result, movement of the cam ring 104 in the optical axis direction is restricted and the cam ring 104 rotates at a fixed position.

a first-group lens barrel 105 that holds a lens is screwed to a filter frame 106. A straight groove (not illustrated) and a cam groove (not illustrated) for linearly guiding the filter frame 106 are formed in the guide barrel 103 and the cam ring 104. A second-group base 108 hangs, using a roller, a second-group lens barrel 107 that holds a lens. A straight groove (not illustrated) and a cam groove (not illustrated) for linearly guiding the second-group base 108 back and forth in the optical axis direction are formed in the guide barrel 103 and the cam ring 104.

A rear-group unit has a configuration in which a light quantity adjustment device (aperture unit) 109, a third-group unit (image stabilizing unit) 110, a fourth-group lens barrel 111, and a fifth-group lens barrel 112 are integrally coupled. The guide barrel 103 and the cam ring 104 move the rear-group unit back and forth in the optical axis direction.

For this purpose, a straight groove (not illustrated) and a cam groove (not illustrated) for linearly guiding the rear-group unit are formed in each of the guide barrel 103 and the cam ring 104.

A cam follower (not illustrated) provided in the filter frame 106 is engaged with the straight groove (not illustrated) and the cam groove (not illustrated) for linear guiding provided in the guide barrel 103 and the cam ring 104. A cam follower (not illustrated) provided in the second-group base 108 is engaged with the straight groove (not illustrated) and the cam groove (not illustrated) for linear guiding provided in the guide barrel 103 and the cam ring 104. Furthermore, in the rear-group unit, a cam follower (not illustrated) attached to a third-group base member (movable barrel, or second barrel) 113 in the third-group unit 110 is engaged with the straight groove (not illustrated) and the cam groove (not illustrated) for linear guiding provided in the guide barrel 103 and the cam ring 104.

the fifth-group lens barrel 112 is radially positioned through engagement between a positioning pin and a hole with respect to the third-group base member 113. The fifth-group lens barrel 112 and the third-group base member 113 are in contact with each other in the optical axis direction and fastened to each other with screws. The fourth-group lens barrel 111 is a focusing unit. The fourth-group lens barrel 111 is held by a guide bar 115 both ends of which are held by the third-group base member 113 and an adjustment piece 114. The adjustment piece 114 is in contact with and fixed to the fifth-group lens barrel 112. The fourth-group lens barrel 111 that holds a lens is moved back and forth in the optical axis direction by a driving unit. The driving unit includes a motor (driving source, not illustrated), a feed screw (not illustrated) rotated by the motor (not illustrated), and a rack (not illustrated) attached to the fourth-group lens barrel 111 and engaged with the feed screw (not illustrated). The rack (not illustrated) converts the rotation of the feed screw (not illustrated) into the driving force in the optical axis direction, and moves the fourth-group lens barrel 111 in the optical axis direction. The fourth-group lens barrel 111 is slidably engaged with the above-described guide bar 115 extending in the optical axis direction, thereby being guided linearly.

the rack (not illustrated) is held rotatably around an axis (not illustrated) extending in the optical axis direction with respect to the fourth-group lens barrel 111. The rack (not illustrated) is biased in the rotation direction by the biasing force generated by a torsion coil spring (not illustrated) and acting in a torsional direction, and is pressed against the feed screw (not illustrated) and the guide bar 115 from one of the radial directions thereof. Furthermore, the rack (not illustrated) is biased by the biasing force generated by the torsion coil spring (not illustrated) and acting in the optical axis direction, and is pressed against the fourth-group lens barrel 111 from one direction in the optical axis direction. Through the above biasing forces, the rack (not illustrated), the feed screw (not illustrated), the guide bar 115, and the fourth-group lens barrel 111 are pressed against one another and the play between these members is prevented.

Movement of a zoom operation ring 116 in the optical axis direction is restricted due to bayonet coupling with the outer ring 102, and the zoom operation ring 116 rotates at a fixed position. A zoom key is fixed (not illustrated) to an outer diameter portion of the cam ring 104 and the zoom key is engaged with the zoom operation ring 116, whereby the cam ring 104 rotates in conjunction with the rotation of the zoom operation ring 116 around the optical axis.

A focus ring 117 is sandwiched between the outer ring 102 and a restricting frame 118 in the optical axis direction, movement of the focus ring 117 in the optical axis direction is restricted, and the focus ring 117 is radially fitted to the outer ring 102. The restricting frame 118 is radially fitted to the outer ring 102 and contacts an object-side end face of the outer ring 102. Furthermore, the restricting frame 118 is fastened to the outer ring 102 with a plurality of elastic engaging claws (not illustrated) formed integrally with the restricting frame 118.

Slit shapes are formed at regular intervals in the circumferential direction of a flange portion 119 on the inner periphery of the focus ring 117. A detection member (not illustrated) that detects the rotation amount and rotation direction of the focus ring 117 includes two photo interrupters arranged at a predetermined interval in the circumferential direction so as to optically detect the movement of the slit shapes in the rotation direction.

The motor (not illustrated) rotates in response to a predetermined driving signal from a control circuit on a circuit board 120 based on the output from the detection member (not illustrated), whereby the fourth-group lens barrel 111 moves back and forth in the optical axis direction.

A focus reset switch (not illustrated) incorporated in the third-group base member 113 includes a photo interrupter. The photo interrupter optically detects movement of a light shielding wall (not illustrated). The focus reset switch is provided to detect that the fourth-group lens barrel 111 is at a reference position.

the characteristic configuration of the present exemplary embodiment will be described below with reference to FIGS. 2 to 9.

A flexible printed circuit board 9 electrically connects a connection portion (first connection portion) of the circuit board 120 and a connection portion (second connection portion) of the motor (not illustrated) of the light quantity adjustment device 109, and supplies, from the camera body, power and driving signals for driving the light quantity adjustment device 109. In other words, this flexible printed circuit board 9 is connected to both the guide barrel 103 and the third-group base member 113. When the third-group base member 113 moves, the flexible printed circuit board 9 is properly deformed to maintain the connection between the guide barrel 103 and the third-group base member 113.

A flexible printed circuit board 10 (not illustrated) similarly supplies power and driving signals to the image stabilizing unit 110. The flexible printed circuit board 10 is positioned at a different phase position from the light quantity adjustment device 109. The two flexible printed circuit boards 9 and 10 have similar structures and provide similar effects in the present exemplary embodiment. Therefore, in the following description of the present exemplary embodiment, only the flexible printed circuit board 9 connected to the light quantity adjustment device 109 will be described.

<Restriction of Flexible Printed Circuit Board in Thickness Direction>

Restriction of the flexible printed circuit board in the thickness direction thereof will be described with reference to FIGS. 2 to 5. A portion 9a of the flexible printed circuit board 9 connected to the connection portion (not illustrated) of the light quantity adjustment device 109 is fixed to the third-group base member 113 using, for example, a double-sided tape or adhesive.

The flexible printed circuit board 9 is bent at approximately 180 degrees at one place thereof, and this bent portion (folded portion) 9c is inserted into an opening (first restricting portion sandwiching the flexible printed circuit board) 103b provided in the guide barrel (fixed barrel) 103. Since the opening 103b sandwiches the flexible printed circuit board 9 in such a manner that the bent portion does not unfold, a part of the flexible printed circuit board 9 on the side of the third-group base member 113 (on the opposite side of the opening 103b) is brought closer to the guide barrel 103, whereby the movement of the flexible printed circuit board 9 inward in the radial direction is restricted. In the present exemplary embodiment, a first protrusion (first restricting portion, or a first restricting portion for the flexible printed circuit board in the thickness direction) 103a constituting a part of the edge of the opening 103b comes in contact with (touches) a portion 9d of the flexible printed circuit board 9 in the radial direction. At this time, the position of the portion 9d is fixed (held) between the first protrusion of the guide barrel 103 and a portion 103h of the edge of the guide barrel due to reaction force acting in a direction of unfolding the bent portion 9c.

A portion 9e of the flexible printed circuit board 9 comes in contact with (touches) a second protrusion (a protruding portion, a second restricting portion, or a second restricting portion for the flexible printed circuit board in the thickness direction) 103c of the guide barrel 103 in the radial direction in a range up to a light quantity adjustment device connector (connection portion) 120a of the circuit board 120 that is a part of the guide barrel 103. As described above, the second protrusion has a shape protruding toward the third-group base member 113. Therefore, the flexible printed circuit board 9 is restricted from moving inward in the radial direction by the first protrusion (first restricting portion) 103a and restricted from moving outward in the radial direction by the second protrusion (protruding portion) 103c. In other words, the first restricting portion restricts the movement of the flexible printed circuit board 9 in the thickness direction so that a part of the third-group base member 113 on the side of the fixed portion 9a is brought closer to the guide barrel 103 than the position of the flexible printed circuit board 9 restricted by the first restricting portion. The protruding portion 103c restricts the movement of the flexible printed circuit board 9 in the thickness direction in such a manner that the fixed portion 9a of the flexible printed circuit board 9 on the side of the third-group base member 113 is pushed (away) from the guide barrel 103 farther than the above-mentioned position of the flexible printed circuit board 9 restricted by the first restricting portion 103a. Meanwhile, the first restricting portion may be provided on the third-group base member 113 as long as the first restricting portion and the protruding portion (the second restricting portion) are disposed to achieve these functions.

A curved portion 9b is formed in the flexible printed circuit board 9 between the first protrusion (first restricting portion provided on the guide barrel 103) 103a and the fixed portion 9a on the side of the third-group base member 113. When the zoom operation is performed by the zoom operation ring 116, the third-group base member 113 moves back and forth in the optical axis direction. Therefore, the positional relationship in the optical axis direction between the guide barrel 103 and the fixed portion 9a (fixed portion on the side of the third-group base member 113) of the flexible printed circuit board 9 changes, and the position of the curved portion 9b also moves back and forth in the optical axis direction.

<Restriction of Flexible Printed Circuit Board in Optical Axis Direction>

Restriction of the flexible printed circuit board in the optical axis direction, i.e., restriction of movement of the flexible printed circuit board 9 in the longitudinal direction (optical axis direction) will be described with reference to FIGS. 6 to 9.

The portion 9e of the flexible printed circuit board 9 that comes in contact with the second protrusion 103c provided on the guide barrel 103 includes extending portions 9f and 9g that protrude (extend) in the width direction of the portion 9e. The width direction used here is a direction perpendicular to both the thickness direction and the longitudinal direction (optical axis direction) of the flexible printed circuit board. The extending portions 9f and 9g are inserted into openings (holes) 103f and 103g provided in the guide barrel 103, respectively. The openings 103f and 103g are holes bored in the width direction of the flexible printed circuit board 9, i.e., in the extending direction of the extending portions 9f and 9g. The openings 103f and 103g function as an optical axis direction restricting portion. End portions are present in the openings 103f and 103g on both sides in the longitudinal direction (optical axis direction) and in the thickness direction (radial direction of the optical axis) of the flexible printed circuit board 9. Therefore, these end portions on both sides restrict the extending portions 9f and 9g from moving in the longitudinal direction and the thickness direction of the flexible printed circuit board 9. As a result, the extending portions 9f and 9g can move only within ranges of the openings 103f and 103g in the optical axis direction (within opening ranges), and the moving range of the flexible printed circuit board 9 in the optical axis direction is restricted.

Here, the length of the openings 103f and 103g in the optical axis direction that determines the moving range of the flexible printed circuit board 9 in the optical axis direction is slightly longer than the width of the extending portions 9f and 9g of the flexible printed circuit board 9 (desirably, longer by 5% or more and less than 20%). With this configuration, the assembling work becomes easy, and it is possible to almost prevent the flexible printed circuit board from moving in the optical axis direction. Furthermore, it is possible to reduce the possibility that the flexible printed circuit board would be rubbed and deteriorated, or make a sound. In a more preferred exemplary embodiment, the length of the openings 103f and 103g in the optical axis direction that determines the moving range of the flexible printed circuit board 9 in the optical axis direction may be equal to the width of the extending portions 9f and 9g of the flexible printed circuit board 9. With this configuration, the extending portions 9f and 9g hardly move in the optical axis direction after being inserted into the openings 103f and 103g respectively, and thus the above effect can be obtained more remarkably.

At this time, the extending portions 9f and 9g go over protruding portions 103d and 103e provided on the guide barrel 103 and are inserted into the openings from the inner diameter side. Thus, after the extending portions 9f and 9g are inserted into the openings, the protruding portions 103d and 103e restrict the extending portions 9f and 9g from falling off toward the inner diameter side. At this time, to facilitate the insertion, the protruding portions of the flexible printed circuit board may have various shapes protruding in the width direction from the portion 9e, like extending portions 9h and 9i illustrated in FIG. 9. The shapes of these protruding portions may be appropriately combined.

A reinforcing plate (reinforcing member), which makes it difficult for the flexible printed circuit board 9 to deform, may be attached to a portion of the flexible printed circuit board 9 between the position of the portion 9e that is in contact with the second restricting portion and the position of the first restricting portion or a position near the first restricting portion on the side of the second restricting portion. The method of attaching the reinforcing plate may be either adhesion or use of a tape. The reinforcing plate should at least be formed of a material (which may be either metal or resin) and have a shape (which may be a rod shape instead of the plate shape) that make it difficult for the flexible printed circuit board to bend to such an extent that the deformation of the flexible printed circuit board can be somewhat reduced.

<Effects Obtained by Zoom Driving>

In the present exemplary embodiment, the fixed portion 9a of the flexible printed circuit board 9 fixed to the third-group base member 113 moves back and forth in the optical axis direction together with the third-group base member 113 by the zoom operation. The curved portion 9b of the flexible printed circuit board 9 is formed between the fixed portion 9a of the flexible printed circuit board 9 and the portion 9d of the same flexible printed circuit board 9. The position of the portion 9d is fixed between the first protrusion of the guide barrel 103 and the portion 103h of the edge of the guide barrel 103, due to the reaction force acting in the direction of unfolding the bent portion 9c of the flexible printed circuit board 9. This curved portion 9b also moves back and forth in the optical axis direction. As a feature of the present exemplary embodiment, the flexible printed circuit board 9 is restricted from moving inward in the radial direction by the first protrusion (first restricting portion) 103a, and restricted from moving outward in the radial direction by the second protrusion (second restricting portion) 103c.

By employing such a configuration, even if the curved portion 9b moves back and forth in the optical axis direction along with the zoom operation, the flexible printed circuit board 9 hardly moves in the thickness direction thereof between the portions 9d and 9e. Therefore, it is possible to provide a highly reliable lens apparatus with a low possibility of cutting off the flexible printed circuit board. In addition, the openings 103f and 103g restrict the moving range, in the optical axis direction, of the protruding portions (extending portions) 9f and 9g protruding in the width direction at the position of the portion 9e of the flexible printed circuit board 9. Therefore, the lens apparatus can have a highly reliable configuration.

The present disclosure is of course applicable to an imaging apparatus C, as shown in FIG. 10, including a camera body CB having an image sensor S such as a photoelectric conversion element and the lens apparatus L described in the above-described exemplary embodiment configured to guide imaging light from an object to the image sensor S. The present disclosure is also applicable to optical apparatuses such as an observation apparatus, binoculars, and a telescope, other than an imaging apparatus.

while the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-025378, filed Feb. 14, 2017, which is hereby incorporated by reference herein in its entirety.

What is claimed is:

1. A lens apparatus comprising:
   a first barrel including a first connection portion;
   a second barrel that holds a lens, is movable in an optical axis direction of the lens relative to the first barrel, is held on an inner side of the first barrel in a radial direction of the optical axis, and includes a second connection portion; and
   a flexible printed circuit board that electrically connects the first connection portion and the second connection portion,
   wherein the first barrel includes a first protruding portion which protrudes to a side opposite to the second barrel in the radial direction and a second protruding portion which protrudes toward the second barrel in the radial direction,
   wherein the first protruding portion restricts a first portion of the flexible printed circuit board between the first and second connection portions from moving toward the second barrel in the radial direction, and
   wherein the second protruding portion restricts a second portion of the flexible printed circuit board between the first and second connection portions from moving toward the side opposite to the second barrel in the radial direction.

2. The lens apparatus according to claim 1, wherein the first and second protruding portions are disposed at mutually different positions in the optical axis direction.

3. The lens apparatus according to claim 1, wherein the first and second protruding portions overlap when viewed from the optical axis direction.

4. The lens apparatus according to claim 1, wherein a portion of the flexible printed circuit board between the first and second portions contacts only the first barrel.

5. The lens apparatus according to claim 1, wherein the first barrel includes a restricting portion that restricts the flexible printed circuit board from moving in which optical axis direction.

6. The lens apparatus according to claim 5, wherein the second protruding portion and the restricting portion at least partially overlap in the optical axis direction.

7. The lens apparatus according to claim 1,
   wherein the flexible printed circuit board includes two extending portions that extend in a direction perpendicular to both the optical axis direction and the radial direction, and
   wherein the first barrel includes two holes, and restricts the flexible printed circuit board from moving in the optical axis direction by the two extending portions being inserted into the two holes.

8. The lens apparatus according to claim 1, further comprising a plate disposed at a portion of the flexible printed circuit board between the first and second protruding portions to reduce deformation of the flexible printed circuit board in the radial direction.

9. The lens apparatus according to claim 1, wherein the second protruding portion protrudes toward the second barrel more than the first protruding portion does in the radial direction.

10. The lens apparatus according to claim 1, wherein the flexible printed circuit board includes a bent portion folded back in the optical axis direction and a curved portion folded back at a larger radius than the bent portion.

11. The lens apparatus according to claim 10, wherein the bent portion is held by the first protruding portion due to reaction force acting in a direction of unfolding the bent portion.

12. The lens apparatus according to claim 10, wherein the second protruding portion pushes the second portion by reaction force acting in a direction of unfolding the curved portion.

13. The lens apparatus according to claim 10,
wherein the bent portion is held by the first protruding portion, and
wherein the second portion is pushed more inward than an outermost portion of the bent portion in the radial direction.

14. An imaging apparatus comprising:
the lens apparatus according to claim 1; and
an image sensor configured to receive light from the lens apparatus.

15. A lens apparatus comprising:
a first barrel including a first connection portion;
a second barrel that holds a lens, is movable in an optical axis direction of the lens relative to the first barrel, is held on an inner side of the first barrel in a radial direction of the optical axis, and includes a second connection portion; and
a flexible printed circuit board that electrically connects the first connection portion and the second connection portion,
wherein one of the first barrel or the second barrel includes a restricting portion which restricts a portion of the flexible printed circuit board between the first and second connection portions from moving in the radial direction,
wherein the first barrel includes a protruding portion which restricts a portion of the flexible printed circuit board between the first and second connection portions from moving outward in the radial direction,
wherein the flexible printed circuit board includes two extending portions that extend in a direction perpendicular to both the optical axis direction and the radial direction, and
wherein the first barrel includes two holes, and restricts the flexible printed circuit board from moving in the optical axis direction by the two extending portions being inserted into the two holes.

16. A lens apparatus comprising:
a first barrel including a first connection portion;
a second barrel that holds a lens, is movable in an optical axis direction of the lens relative to the first barrel, is held on an inner side of the first barrel in a radial direction of the optical axis, and includes a second connection portion; and
a flexible printed circuit board that electrically connects the first connection portion and the second connection portion,
wherein one of the first barrel or the second barrel includes a first restricting portion which restricts a portion of the flexible printed circuit board between the first and second connection portions from moving in the radial direction,
wherein the first barrel includes a protruding portion which restricts a portion of the flexible printed circuit board between the first and second connection portions from moving outward in the radial direction,
wherein the first barrel includes a second restricting portion which restricts the flexible printed circuit board from moving in the optical axis direction, and
wherein the protruding portion and the second restricting portion at least partially overlap in the optical axis direction.

* * * * *